(12) United States Patent
Mizuno et al.

(10) Patent No.: US 9,534,675 B2
(45) Date of Patent: Jan. 3, 2017

(54) TRANSMISSION WITH REVERSE FOR VEHICLE

(71) Applicant: HONDA MOTOR CO., LTD., Tokyo (JP)

(72) Inventors: Kinya Mizuno, Wako (JP); Yasushi Fujimoto, Wako (JP); Eiji Kittaka, Wako (JP); Hiroyuki Makita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 107 days.

(21) Appl. No.: 14/666,643

(22) Filed: Mar. 24, 2015

(65) Prior Publication Data
US 2015/0276033 A1 Oct. 1, 2015

(30) Foreign Application Priority Data
Mar. 28, 2014 (JP) .................................. 2014-067767

(51) Int. Cl.
| | | |
|---|---|---|
| F16H 3/08 | (2006.01) | |
| F16H 37/02 | (2006.01) | |
| B62M 9/00 | (2006.01) | |
| B62M 11/04 | (2006.01) | |
| F16H 3/00 | (2006.01) | |
| F16H 3/16 | (2006.01) | |
| F16H 3/091 | (2006.01) | |

(52) U.S. Cl.
CPC .............. *F16H 37/027* (2013.01); *B62M 9/00* (2013.01); *B62M 11/04* (2013.01); *F16H 3/006* (2013.01); *F16H 3/16* (2013.01); *F16H 3/0915* (2013.01); *F16H 2003/0822* (2013.01); *F16H 2200/0056* (2013.01); *Y10T 74/19219* (2015.01)

(58) Field of Classification Search
CPC .................................. F16H 3/089; F16H 3/006
USPC ........................................................... 74/329
See application file for complete search history.

(56) References Cited

U.S. PATENT DOCUMENTS

| | | | | |
|---|---|---|---|---|
| 8,001,862 B2* | 8/2011 | Albulushi | ............... | F16H 3/089 |
| | | | | 74/329 |
| 8,396,636 B2* | 3/2013 | Minami | .................. | F16D 48/06 |
| | | | | 192/3.51 |
| 9,157,510 B2* | 10/2015 | Kojima | ................. | F16H 61/688 |

(Continued)

FOREIGN PATENT DOCUMENTS

JP            2-027712 Y2     7/1990

*Primary Examiner* — Ha D Ho
(74) *Attorney, Agent, or Firm* — Birch, Stewart, Kolasch & Birch, LLP

(57) ABSTRACT

A main shaft side sprocket wheel and a countershaft side sprocket wheel are provided for relative rotation on the shafts with a chain wrapped around and extended between the sprocket wheels. One of the driven gears is a floating gear provided for relative rotation on the countershaft. The countershaft side sprocket wheel is provided for integral rotation with the floating gear. The main shaft includes a main shaft inner shaft which includes the main shaft side sprocket wheel, and an outer pipe disposed coaxially on the outer side of the main shaft inner shaft in a diametrical direction and capable of being placed into and out of integral rotation with the main shaft side sprocket wheel. A reverse transmission gear for meshing with a driven gear is provided on the outer pipe. A reduction gear ratio by the floating gear or the reverse transmission gear is set higher than 1.

20 Claims, 5 Drawing Sheets

(56) References Cited

U.S. PATENT DOCUMENTS

| | | | |
|---|---|---|---|
| 9,285,029 B2 * | 3/2016 | Kojima | F16D 48/064 |
| 2007/0062318 A1 * | 3/2007 | Chang | F16H 3/089 74/325 |

* cited by examiner

TRANSMISSION WITH REVERSE FOR VEHICLE

CROSS-REFERENCE TO RELATED APPLICATIONS

The present application claims priority under 35 USC 119 to Japanese Patent Application No. 2014-067767 filed Mar. 28, 2014 the entire contents of which are hereby incorporated by reference.

BACKGROUND OF THE INVENTION

1. Field of the Invention

The present invention relates to a transmission with a reverse for a vehicle wherein a chain for reversing is provided in a transmission chamber.

2. Description of Background Art

A structure of a transmission with a reverse for a vehicle wherein a driving sprocket wheel is provided on a main shaft and a driven sprocket wheel is provided on a countershaft while a chain for reversing is wrapped around and extends between the sprocket wheels is known. See, for example, Japanese Utility Model Publication No. Hei 2-027712. With such a structure as just described, reverse traveling can be carried out without setting an idler gear on an idler shaft for reversing.

Since reverse traveling is carried out such that a vehicle begins to move from a stopping state, high torque is required with respect to rotational input power from an internal combustion engine, and a high reduction gear ratio is required.

In the structure disclosed in Japanese Utility Model Publication No. Hei 2-027712, in order to obtain a high reduction gear ratio for reversing, it is necessary to use a greater size difference between the driving sprocket wheel and the driven sprocket wheel. Therefore, also it is necessary to use a long distance between the main shaft and the countershaft. Thus, it is possible that the transmission chamber will increase in size.

Further, if the driving sprocket wheel is increased in size and the distance between the shafts is increased, then the chain is increased in length as well and the deflection region of the chain increases. As a result, the size of the transmission chamber is likely to be increased.

SUMMARY AND OBJECTS OF THE INVENTION

An embodiment of the present invention has been made in view of the prior art described above, wherein a transmission with a reverse for a vehicle includes a chain for reversing that is provided in a transmission chamber having a sufficient reduction gear ratio and suppress upsizing of the transmission chamber while the size difference in a diametrical direction between a driving sprocket wheel and a driven sprocket wheel between and around which the chain extends is suppressed.

According to an embodiment of the present invention, a transmission with a reverse for a vehicle includes a main shaft in which a plurality of trains of driving gears are provided and to which rotation from an internal combustion engine is inputted. A countershaft is provided on which a plurality of trains of driven gears which mesh with the plurality of trains of driving gears are provided and which is disposed in parallel to the main shaft. A main shaft side sprocket wheel and a countershaft side sprocket wheel are provided for relative rotation on the main shaft and the countershaft, respectively. A chain for reversing the operation of the transmission is wrapped around and extends between the main shaft side sprocket wheel and the countershaft side sprocket wheel. One of the plurality of driven gears is a floating gear provided for relative rotation on the countershaft with the countershaft side sprocket wheel being provided for integral rotation with the floating gear. The main shaft includes a main shaft inner shaft which includes the main shaft side sprocket wheel, and an outer pipe disposed coaxially on an outer side of the main shaft inner shaft in a diametrical direction and capable of being placed into and out of integral rotation with the main shaft side sprocket wheel. A reverse transmission gear, which meshes with a driven gear on the countershaft, is provided on the outer pipe with a reduction gear ratio by the floating gear (and) or the reverse transmission gear being set higher than 1.

According to an embodiment of the present invention, a first clutch and a second clutch are provided in the transmission with a reverse for a vehicle between the transmission and the internal combustion engine. The main shaft inner shaft is connected at one end side thereof to the first clutch with the outer pipe being a main shaft outer shaft connected at one end side thereof to the second clutch. Part of the plurality of driving gears is provided on the main shaft outer shaft with a shifter gear being provided on the main shaft outer shaft for integral rotation with the main shaft outer shaft and for movement in an axial direction. Dog clutches which mesh for connection and disconnection with each other are provided on the main shaft side sprocket wheel and the shifter gear.

According to an embodiment of the present invention, the main shaft outer shaft is provided such that another end portion thereof extends to an intermediate portion of the main shaft inner shaft to another end portion. The shifter gear is disposed on the other end portion of the main shaft outer shaft with the main shaft side sprocket wheel being disposed on the main shaft inner shaft so as to neighbor with the other end portion of the same main shaft outer shaft.

According to an embodiment of the present invention, a driving gear which drives the floating gear is provided adjacent the main shaft side sprocket wheel with the floating gear and the countershaft side sprocket wheel being formed integrally with each other.

According to an embodiment of the present invention, a driving gear which drives the floating gear is a first speed driving gear.

According to an embodiment of the present invention, the reverse transmission gear is a second speed driving gear on the main shaft outer shaft.

According to an embodiment of the present invention, the transmission for reversing the rotation from the internal combustion engine is transmitted from the driving gear of the main shaft inner shaft to the floating gear which is a driven gear of the countershaft, from the floating gear to the countershaft side sprocket wheel, from the countershaft side sprocket wheel to the main shaft side sprocket wheel through the chain, from the main shaft side sprocket wheel to the outer pipe, from the outer pipe to the reverse transmission gear, and from the reverse transmission gear to the driven gear of the countershaft. Consequently, since the transmission system for reversing the transmission is configured using driving force transmission of both of the gear system and the chain system, the necessity for an idling shaft for exclusive use for reversing is eliminated. Further, a reduction gear ratio higher than 1 can be assured in both of the gear systems of the floating gear (and) or the reverse transmission gear.

Therefore, even if the reduction gear ratio for reversing the chain system between the main shaft side sprocket wheel and the countershaft side sprocket wheel is not raised very much, namely, even if the size difference between the two sprocket wheels is not made very great, the reduction gear ratio for reversing can be assured in the gear system. As a result, the distance between the main shaft and the countershaft can be suppressed similarly as in an ordinary transmission which uses a gear transmission mechanism, and also deflection of the chain is suppressed. Therefore, the size of the transmission chamber in which the chain is used can be suppressed.

According to an embodiment of the present invention, a so-called dual clutch type transmission in which two clutches are provided is used, a transmission system for reversing, which uses both chain system and a gear system, can be configured.

According to an embodiment of the present invention, meshing engagement between the shifter gear and the main shaft side sprocket wheel can be established by a compact and simple configuration, and the main shaft side sprocket wheel and the main shaft outer shaft can be integrally rotated and can be separated from each other.

According to an embodiment of the present invention, the floating gear and the countershaft side sprocket wheel can be configured compactly.

According to an embodiment of the present invention, a reduction gear ratio for reversing the floating gear can be obtained readily by a comparatively high speed reduction gear ratio of the floating gear formed from the first speed driven gear and the first speed driving gear.

According to an embodiment of the present invention, the reduction gear ratio for reversing the reverse transmission gear can be obtained by a comparatively high reduction gear ratio of the reverse transmission gear formed from the second speed driving gear and the second speed driven gear serving as a driven gear on the countershaft and meshing with the reverse transmission gear.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A transmission with a reverse for a vehicle according to an embodiment of the present invention is described with reference to FIGS. 1 to 5.

Directions such as forward, rearward, leftward, rightward, upward, and downward directions in the claim and the description of the present specification conform to directions with regard to a vehicle which includes the transmission with a reverse for a vehicle of the present embodiment. In the present embodiment, the vehicle is a saddle type vehicle and particularly is a motorcycle.

In the figures, an arrow mark FR indicates the forward direction of the vehicle; LH the leftward direction of the vehicle; RH the rightward direction of the vehicle; and UP the upward direction of the vehicle.

Figure 1:
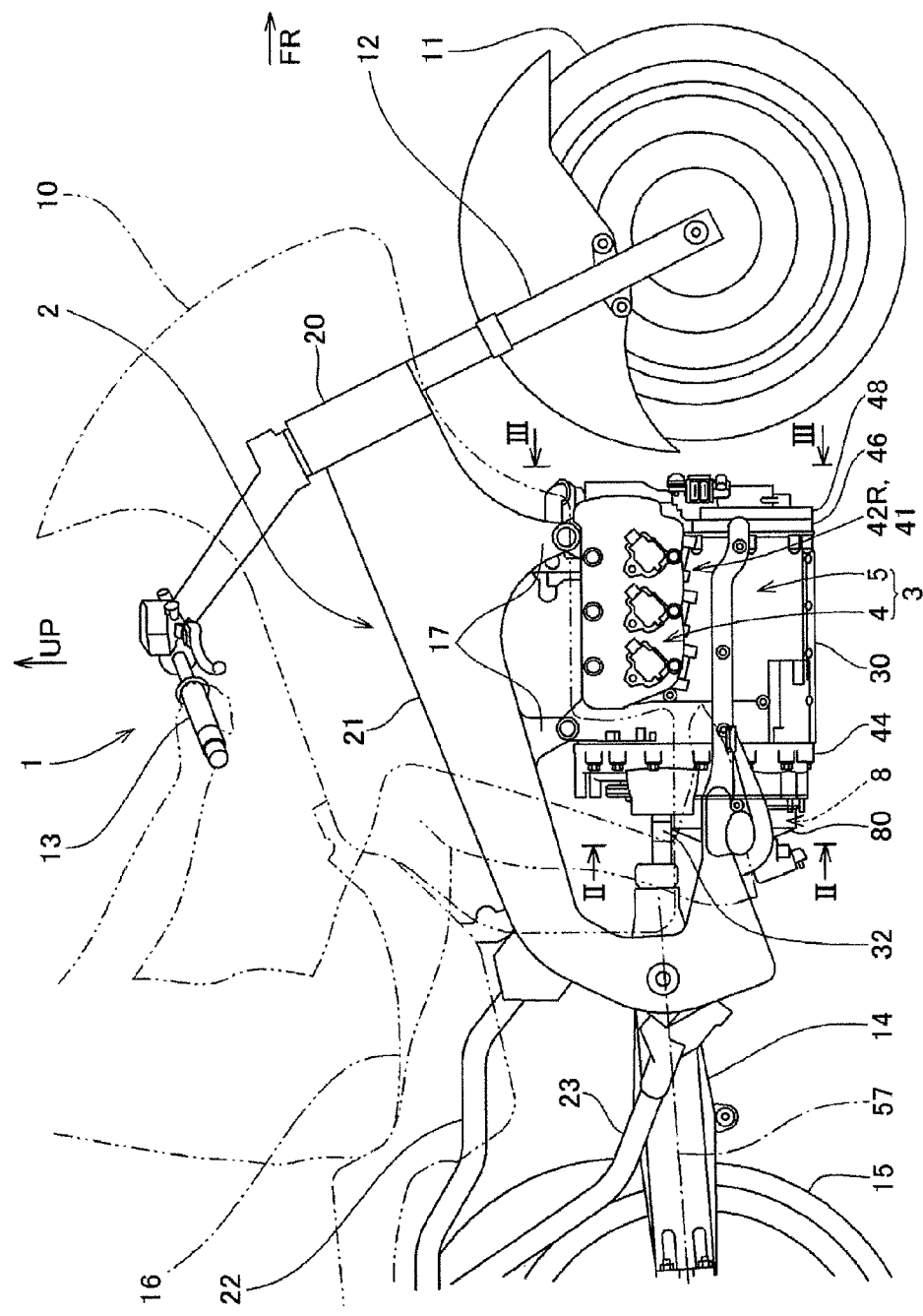
FIG. 1 is a partial right side elevational view of a motorcycle including a power unit having a transmission with reverse for a vehicle according to an embodiment of the present invention.

FIG. 1 is a partial right side elevational view of a motorcycle including a power unit have the transmission with reverse for a vehicle according to the embodiment of the present invention.

Referring to FIG. 1, in a motorcycle 1, only part of a vehicle body cover 10 is indicated simply by alternate long and two short dashes lines with part thereof omitted, and the motorcycle 1 is depicted in a simplified form and partly omitted and with an intake system, an exhaust system, a fuel system and so forth omitted.

A vehicle body frame 2 of the motorcycle 1 includes a head pipe 20, a main frame 21, a seat rail 22, and a back stay 23. The head pipe 20 supports a front fork 12, for supporting a front wheel 11 for rotation thereon, for a steering operation. The main frame 21 extends rearwardly and downwardly from the head pipe 20. The seat rail 22 extends rearwardly and upwardly from an upper portion of a rear end of the main frame 21. The back stay 23 interconnects a lower portion of a rear end of the main frame 21 and a rather rear portion of the seat rail 22.

A steering handlebar 13 is connected to an upper portion of the front fork 12. A swing arm 14 is supported at a front end portion thereof for upward and downward rocking motion to a rear end portion of the main frame 21. A rear wheel 15 which is a driving wheel is supported for rotation at a rear end portion of the swing arm 14.

Further, a rear shock absorber, not shown, is provided between the upper portion of a rear end of the main frame 21 and the swing arm 14 with a riding seat 16 being attached to the seat rail 22.

A power unit 3 for driving the rear wheel 15 is disposed in a space below the main frame 21. The power unit 3 is supported on the main frame 21 through a plurality of hanger members 17.

An output power shaft 32 of the power unit 3 is connected to the rear wheel 15 through a drive shaft 57 attached along the swing arm 14 and transmits rotational power to the rear wheel 15.

Figure 2:
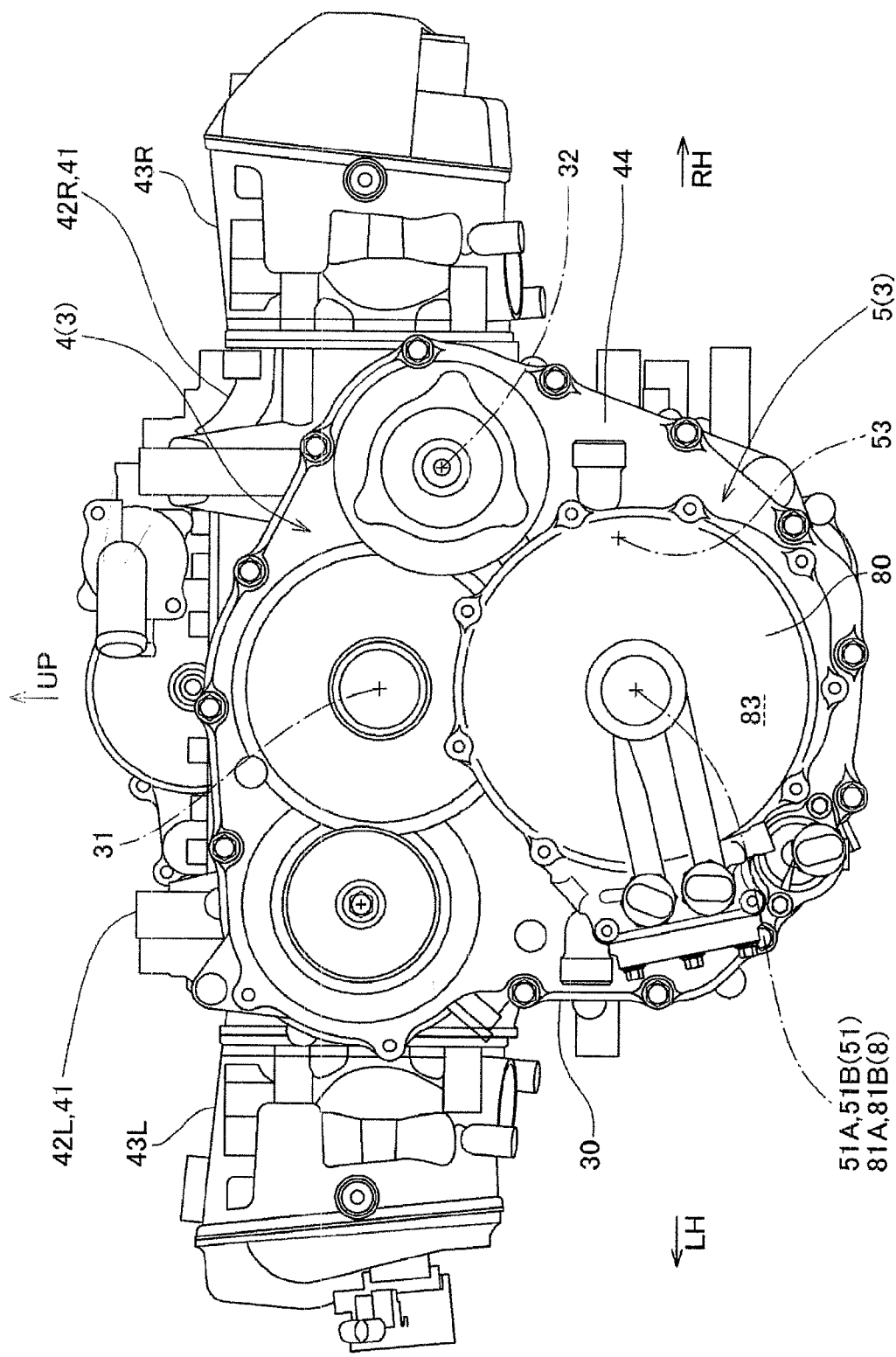
FIG. 2 is a rear elevational view of the power unit as viewed in the direction indicated by an arrow mark II-II in FIG. 1.

FIG. 2 is a rear side elevational view of the power unit 3 as viewed in the direction indicated by an arrow mark II-II in FIG. 1.

As depicted in FIGS. 1 and 2, the power unit 3 includes a four-stroke cycle water-cooled six-cylinder horizontally opposed internal combustion engine 4, and a transmission 5 with a reverse (hereinafter referred to simply as "transmission"). The transmission 5 changes the speed of rotational power of the internal combustion engine 4 and includes a transmission system for reversing the direction of rotation. The transmission 5 includes a clutch mechanism 8 of a hydraulic type hereinafter described (refer to FIG. 4).

An engine main body 41 of the internal combustion engine 4 includes a left engine block 42L, a right engine block 42R, left and right cylinder heads 43L and 43R, and a rear cover 44. The left engine block 42L is disposed on the left side in a state in which it is directed forwardly in the traveling direction of the motorcycle 1. The right engine block 42R is disposed on the right side in a state in which it is directed forwardly in the traveling direction. The left and right cylinder heads 43L and 43R are coupled to the opposite outer ends of the left and right engine blocks 42L and 42R, respectively. The rear cover 44 is coupled to the left and right engine blocks 42L and 42R. The rear cover 44 is coupled in such a manner as to close up a rear portion of a crankcase 30 along the traveling direction of the motorcycle 1.

Pistons not depicted of the engine blocks 42L and 42R are connected commonly to a crankshaft 31 through connecting rods not depicted. The crankshaft 31 has an axial line along the forward and rearward direction of the motorcycle 1. The crankshaft 31 is supported for rotation on a crankcase 30.

A clutch cover 80 is attached to a rear face of the rear cover 44 and covers the clutch mechanism 8 disposed coaxially with a main shaft 51 of the transmission 5 hereinafter described. The output power shaft 32 of the power unit 3 projects toward the rear from the rear cover 44.

The output power shaft 32 is connected to the drive shaft 57 (refer to FIG. 1), which extends along the swing arm 14 and connects to the rear wheel 15, to transmit rotational power of the internal combustion engine 4 to the rear wheel.

Figure 3:
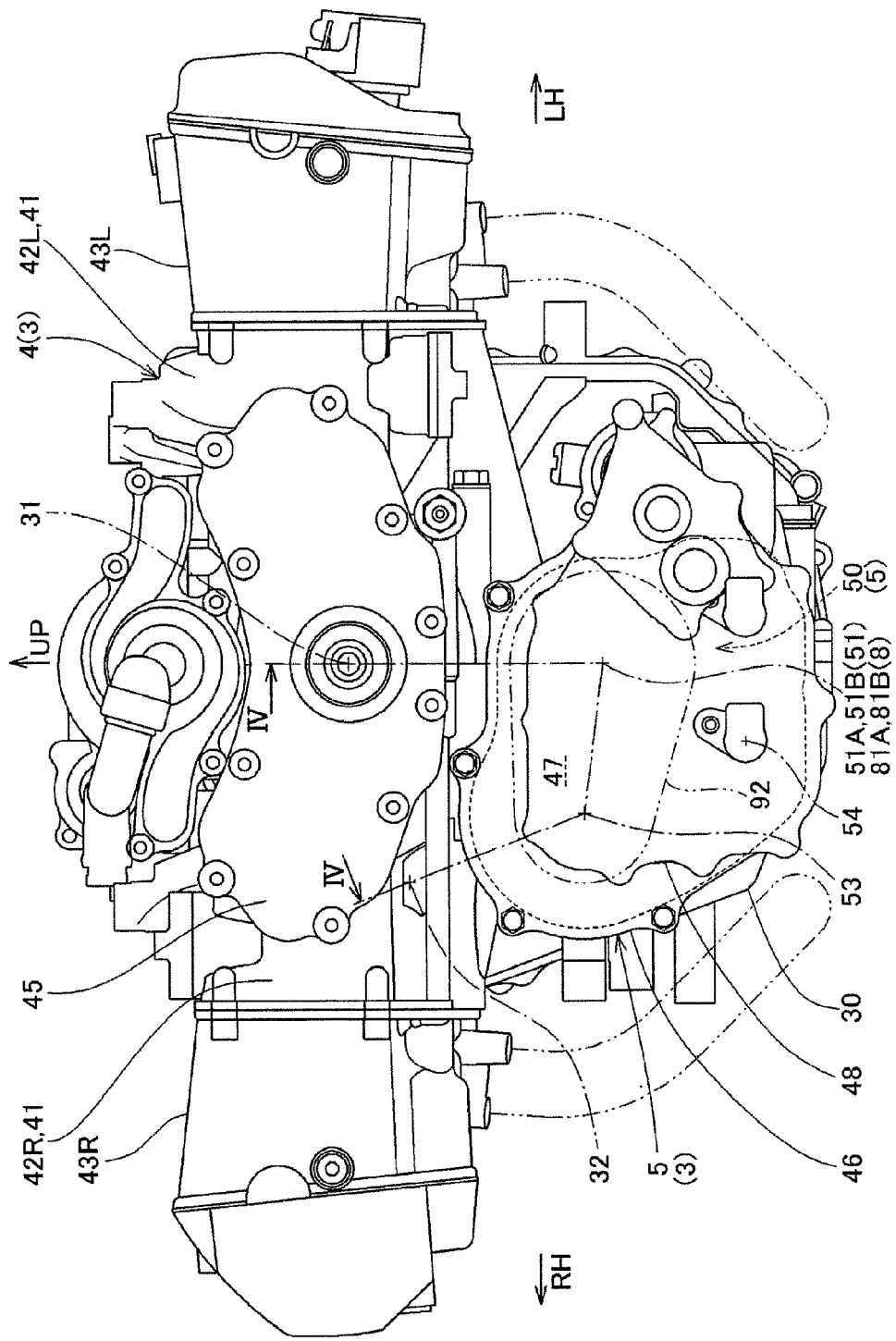
FIG. 3 is a front elevational view of the power unit as viewed in the direction indicated by an arrow mark in FIG. 1.

FIG. 3 is a front elevational view of the power unit 3 as viewed in the direction indicated by an arrow mark III-III in FIG. 1.

As depicted in FIG. 3, a front cover 45 is coupled to the left and right engine blocks 42L and 42R around the crankshaft 31 and is provided so as to close up a front portion of the crankcase 30. Further, a mission holder 46 is coupled to the left and right engine blocks 42L and 42R around the main shaft 51 and a countershaft 53 as well as a shift drum 54 and so forth (the position of the center axis of which is depicted in FIG. 3) of the transmission 5 hereinafter described disposed below the crankshaft 31 so as to close up a front portion of the crankcase 30.

A transmission chamber 47 is formed such that it extends from the mission holder 46 to the inside of the crankcase 30, and a gear transmission mechanism 50 described below is accommodated.

Figure 4:
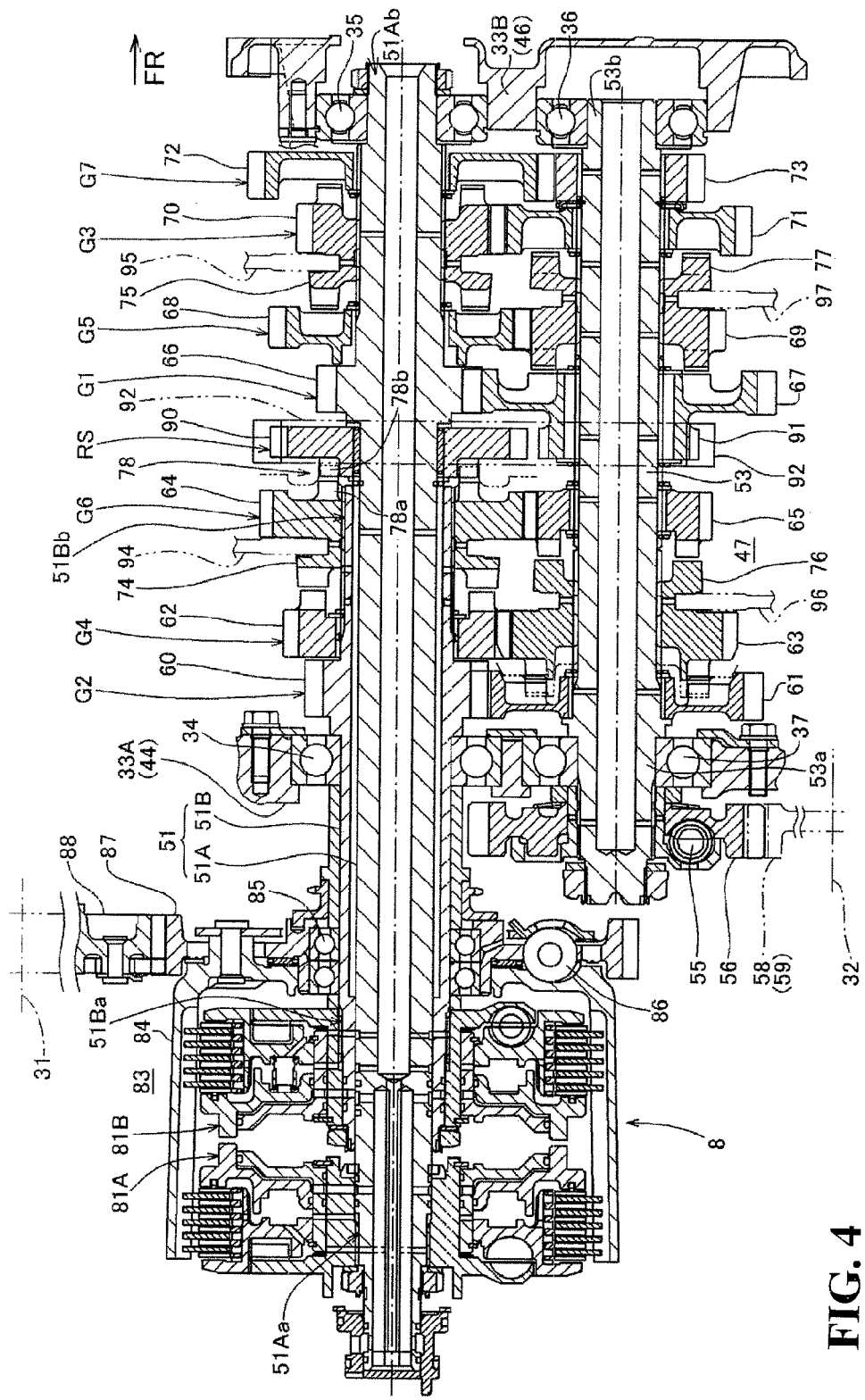
FIG. 4 is a cross-sectional exploded view of the transmission with reverse for a vehicle as viewed in the direction indicated by an arrow mark IV-IV in FIG. 3.

FIG. 4 is a cross-sectional exploded view of the transmission 5 as viewed in the direction indicated by an arrow mark IV-IV in FIG. 3.

As depicted in FIG. 4, the transmission 5 is configured to include the gear transmission mechanism 50, and the clutch mechanism 8 provided between the gear transmission mechanism 50 and the crankshaft 31. The clutch mechanism 8 has a first clutch apparatus 81A ("first clutch" in the present invention) of the hydraulic type and a second clutch apparatus 81B ("second clutch" in the present invention) and configures a so-called dual clutch (or twin clutch).

In the clutch mechanism 8, a clutch outer 84 common to the first clutch apparatus 81A and the second clutch apparatus 81B is attached for rotation on a main shaft outer shaft 51B hereinafter described through a ball bearing 85. A primary driven gear 87 is attached to a front side face of the clutch outer 84 through a damper 86 and is held in meshing engagement with a primary driving gear 88 provided on the crankshaft 31.

The primary driving gear 88 and the primary driven gear 87 configure a first-order reduction gear of the power unit 3 and transmit rotational power of the crankshaft 31 to the clutch outer 84. The rotational power is transmitted from the clutch outer 84 to the gear transmission mechanism 50 of the transmission 5 by the mechanism of the first clutch apparatus 81A and the second clutch apparatus 81B, and is further transmitted to the rear wheel 15.

The structure and operation of the clutch mechanisms which form the dual clutch and the individual clutch apparatus are generally known, and therefore, detailed description of them is omitted herein.

The gear transmission mechanism 50 includes a plurality of shift stages of gear trains, in the present embodiment, first to seventh speed gear trains G1 to G7, which can be selectively established on the main shaft 51 and the countershaft 53 and is accommodated in the crankcase 30.

On the main shaft 51, to which rotation from the internal combustion engine is inputted through the first clutch apparatus 81A and the second clutch apparatus 81B, a plurality of trains of driving gears 60, 62, 64, 66, 68, 70, and 72 are provided. On the countershaft 53 disposed in parallel to the main shaft 51, a plurality of driven gears 61, 63, 65, 67, 69, 71, and 73 which mesh with the plurality of driving gears are provided. The first to seventh speed gear trains G1 to G7 are configured from the driving and driven gears.

The main shaft 51 and the countershaft 53 are provided in parallel to the crankshaft 31.

The main shaft 51 includes a main shaft inner shaft 51A, and a main shaft outer shaft 51B which serve as an outer pipe provided coaxially with the main shaft inner shaft 51A and for relative rotation on the outer side in a diametrical direction of the main shaft inner shaft 51A.

The second, fourth, and sixth speed gear trains G2, G4, and G6, which are speed change gear trains of the even-numbered stages, are provided between the main shaft outer shaft 51B, to which rotation from the internal combustion engine 4 is inputted through the second clutch apparatus 81B, and the countershaft 53.

The first, third, fifth, and seventh speed gear trains G1, G3, G5, and G7, which are speed change gear trains of the odd-numbered stages, are provided coaxially in the main shaft outer shaft 51B and are provided between the main shaft inner shaft 51A, to which rotation from the internal combustion engine 4 is inputted through the first clutch apparatus 81A, and the countershaft 53.

The crankcase 30 is covered, at an opening thereof on the rear side in a direction along an axial line of the crankshaft 31, namely, in the forward and rearward direction of the motorcycle 1, with the rear cover 44 fastened thereto. The crankcase 30 is covered, at an opening thereof on the front side, with the front cover 45 and the mission holder 46 fastened thereto.

A rear side wall 33A is formed on the rear cover 44 and supports a rear portion of the gear transmission mechanism 50. A front side wall 33B is formed on the mission holder 46 in front of the rear side wall 33A such that they are opposed to each other in a spaced relationship from each other. The front side wall 33B supports a front portion of the gear transmission mechanism 50.

It is to be noted that a mission front cover 48 is fastened to the front side of the mission holder 46 so as to cover a bearing portion of the front side wall 33B.

The main shaft outer shaft 51B as an outer pipe formed in a cylindrical form extends, on a rear end side thereof ("one end side" in the present invention), through the rear side wall 33A, and is supported for rotation on the rear side wall 33A through a ball bearing 34. The main shaft outer shaft 51B is provided such that a front end portion ("the other end portion" in the present invention) 51Bb thereof extends to an intermediate portion to a front end portion ("the other end portion" in the present invention) 51Ab of the main shaft inner shaft 51A. The main shaft outer shaft 51B is positioned at an intermediate portion between the rear side wall 33A and the front side wall 33B in such a manner so as to be supported for rotation on the main shaft inner shaft 51A.

The main shaft inner shaft 51A is formed with a diameter smaller than that of the main shaft outer shaft 51B and is provided such that it extends through the main shaft outer shaft 51B which serves as a cylindrical outer pipe and is rotatable relative to the main shaft outer shaft 51B while the relative position thereof in the axial direction to the main shaft outer shaft 51B is fixed. It is to be noted that a plurality of needle bearings not depicted are interposed between the main shaft outer shaft 51B and the main shaft inner shaft 51A.

Further, the main shaft inner shaft 51A is supported at the front end portion 51Ab thereof for rotation on the front side wall 33B through the ball bearing 35.

The countershaft 53 is supported at a front end portion 53b thereof for rotation on the front side wall 33B through the ball bearing 36. The countershaft 53 is supported at a rear end portion 53a thereof for rotation through the ball bearing 37 provided on the rear side wall 33A and extends through the rear side wall 33A. Further, a gear 56 is mounted at a projecting end portion of the countershaft 53 from the rear side wall 33A through a damper spring 55.

The output power shaft 32 (refer to FIG. 2) of the power unit 3 is provided in parallel to the countershaft 53 and extends rearwardly through the rear cover 44 for rotation to transmit power to the drive shaft 57 (refer to FIG. 1) on the rear wheel 15 side. A gear power train 59 including a gear 58 meshing with the gear 56 is provided between the countershaft 53 and the output power shaft 32.

The clutch cover 80 (refer to FIG. 2) is provided on the rear cover 44 and covers the clutch mechanism 8 from the outer side, and first and second clutch apparatus 81A and 81B are accommodated in a clutch chamber 83 formed in the clutch cover 80.

In particular, the first clutch apparatus 81A and the second clutch apparatus 81B are provided on the transmission 5 between the transmission 5 and the internal combustion engine 4. The main shaft inner shaft 51A is connected at a rear end side 51Aa to the first clutch apparatus 81A and is disposed coaxially with and on the outer side in a diametrical direction of the main shaft inner shaft 51A. The main shaft outer shaft 51B, which serves as an outer pipe, is connected at a rear end side 51Ba to the second clutch apparatus 81B.

Between the main shaft outer shaft 51B and the countershaft 53, the second speed gear train G2, fourth speed gear train G4, and sixth speed gear train G6 are provided in a juxtaposed relationship in order from the second clutch apparatus 81B side.

The second speed gear train G2 is configured from a second speed driving gear 60 and a second speed driven gear 61. The second speed driving gear 60 is formed integrally against relative rotation and against movement in an axial direction on the main shaft outer shaft 51B. The second speed driven gear 61 is supported for relative rotation on the countershaft 53 and meshes with the second speed driving gear 60.

It is to be noted that the second speed driving gear 60 serves as a "reverse transmission gear" in the present invention for reversing as hereinafter described.

The fourth speed gear train G4 is configured from a fourth speed driving gear 62 and a fourth speed driven gear 63. The fourth speed driving gear 62 is supported for relative rotation on the main shaft outer shaft 51B. The fourth speed driven gear 63 is supported for movement in an axial direction but against relative rotation on the countershaft 53 and meshes with the fourth speed driving gear 62.

The sixth speed gear train G6 is configured from a sixth speed driving gear 64 and a sixth speed driven gear 65. The sixth speed driving gear 64 is supported for movement in an axial direction but against relative rotation on the main shaft outer shaft 51B. The sixth speed driven gear 65 is supported for relative rotation on the countershaft 53 and meshes with the sixth speed driving gear 64.

It is to be noted that the sixth speed driving gear 64 serves as a "shifter gear" in the present invention for reversing is disposed on the front end portion 51Bb of the main shaft outer shaft 51B as hereinafter described.

Between a projection of the main shaft inner shaft 51A from the front end portion 51Bb of the main shaft outer shaft 51B and the countershaft 53, a reverse sprocket wheel train RS, the first speed gear train G1, the fifth speed gear train G5, the third speed gear train G3, and the seventh speed gear train G7 are provided in a juxtaposed relationship in order from the first clutch apparatus 81A side.

The reverse sprocket wheel train RS is configured from a main shaft side sprocket wheel 90 and a countershaft side sprocket wheel 91. The main shaft side sprocket wheel 90 is supported for relative rotation on the main shaft inner shaft 51A in a neighboring relationship with the front end portion 51Bb of the main shaft outer shaft 51B. The countershaft side sprocket wheel 91 is supported for relative rotation on the countershaft 53. A chain 92 for reverse traveling extends between and is wrapped around the main shaft side sprocket wheel 90 and the countershaft side sprocket wheel 91.

In FIG. 3, an outer periphery of the chain 92 in the wrapped state is indicated by a long and two short dashes line.

The first speed gear train G1 is configured from a first speed driving gear 66 and a first speed driven gear 67. The first speed driving gear 66 is formed integrally against relative rotation and against movement in an axial direction on the main shaft inner shaft 51A. The first speed driven gear 67 is supported for relative rotation on the countershaft 53 and meshes with the first speed driving gear 66.

It is to be noted that the first speed driven gear 67 serves as a "floating gear" in the present invention for reversing as hereinafter described, and is provided such that it is formed integrally with the countershaft side sprocket wheel 91 and integrally rotates on the countershaft 53.

The fifth speed gear train G5 is configured from a fifth speed driving gear 68 and a fifth speed driven gear 69. The fifth speed driving gear 68 is supported for relative rotation on the main shaft inner shaft 51A. The fifth speed driven gear 69 is supported for movement in an axial direction but against relative rotation on the countershaft 53 and meshes with the fifth speed driving gear 68.

The third speed gear train G3 is configured from a third speed driving gear 70 and a third speed driven gear 71. The third speed driving gear 70 is supported for movement in an axial direction but against relative rotation on the main shaft inner shaft 51A. The third speed driven gear 71 is supported for relative rotation on the countershaft 53 and meshes with the third speed driving gear 70.

The seventh speed gear train G7 is configured from a seventh speed driving gear 72 and a seventh speed driven gear 73. The seventh speed driving gear 72 is supported for relative rotation on the main shaft inner shaft 51A. The seventh speed driven gear 73 is supported against rotation on the countershaft 53 and meshes with the seventh speed driving gear 72.

A first shifter 74 is supported against relative rotation but for movement in an axial direction on the main shaft outer shaft 51B between the fourth speed driving gear 62 and the main shaft side sprocket wheel 90. The first shifter 74 is switchable among a state in which it engages with the fourth speed driving gear 62, another state in which it engages with the main shaft side sprocket wheel 90, and a further state in which it does not engage with any of the fourth speed driving gear 62 and the main shaft side sprocket wheel 90. The sixth speed driving gear 64 is provided integrally on the first shifter 74.

A second shifter 75 is supported against relative rotation but for movement in an axial direction on the main shaft inner shaft 51A between the fifth speed driving gear 68 and the seventh speed driving gear 72. The second shifter 75 is switchable among a state in which it engages with the fifth speed driving gear 68, another state in which it engages with the seventh speed driving gear 72, and a further state in which it does not engage with any of the fifth speed driving gear 68 and the seventh speed driving gear 72. The third speed driving gear 70 is provided integrally on the second shifter 75.

A third shifter 76 is supported against relative rotation but for movement in an axial direction on the countershaft 53 between the second speed driven gear 61 and the sixth speed driven gear 65. The third shifter 76 is switchable among a state in which it engages with the second speed driven gear 61, another state in which it engages with the sixth speed driven gear 65, and a further state in which it does not engage with any of the second speed driven gear 61 and the sixth speed driven gear 65. The fourth speed driven gear 63 is provided integrally on the third shifter 76.

A fourth shifter 77 is supported against relative rotation but for movement in an axial direction on the countershaft 53 between the first speed driven gear 67 and the third speed driven gear 71. The fourth shifter 77 is switchable among a state in which it engages with the first speed driven gear 67, another state in which it engages with the third speed driven gear 71, and a further state in which it does not engage with any of the first speed driven gear 67 and the third speed driven gear 71. The fifth speed driven gear 69 is provided integrally on the fourth shifter 77.

By engaging the fourth shifter 77 with the first speed driven gear 67, the first speed gear train G1 is established.

By engaging the third shifter 76 with the second speed driven gear 61 in the state in which the first shifter 74 is not engaged with any of the fourth speed driving gear 62 and the main shaft side sprocket wheel 90, the second speed gear train G2 is established.

By engaging the fourth shifter 77 with the third speed driven gear 71 in the state in which the second shifter 75 is not engaged with any of the fifth and seventh driving gears 68 and 72, the third speed gear train G3 is established.

By engaging the first shifter 74 with the fourth speed driving gear 62 in the state in which the third shifter 76 is not engaged with any of the second and sixth driven gears 61 and 65, the fourth speed gear train G4 is established.

By engaging the second shifter 75 with the fifth speed driving gear 68 in the state in which the fourth shifter 77 is not engaged with any of the first and third speed driven gears 67 and 71, the fifth speed gear train G5 is established.

By engaging the third shifter 76 with the sixth speed driven gear 65 in the state in which the first shifter 74 is not engaged with any of the fourth speed driving gear 62 and the main shaft side sprocket wheel 90, the sixth speed gear train G6 is established.

By engaging the second shifter 75 with the seventh speed driving gear 72, the seventh speed gear train G7 is established.

The first to fourth shifters 74 to 77 are held by first to fourth shift forks 94, 95, 96, and 97 such that they are rotatable but are constrained at positions in an axial direction. The first to fourth shift forks 94, 95, 96, and 97 are individually controlled to operate in an axial direction to predetermined positions by rotation of the shift drum 54 (refer to FIG. 3) of a change mechanism disposed in parallel to the axes of them. The first to fourth shifters 74 to 77 are moved to predetermined positions by the positions of the first to fourth shift forks 94, 95, 96, and 97 to change over one of the speed change gear trains G1 to G7 (shift stages: first to seventh speeds) to be used for power transmission between the main shaft 51 and the countershaft 53.

At such shift stages which are used for forward traveling as described above, if the rotational direction of the crankshaft 31 is determined as a direction of "forward rotation," then the primary driven gear 87 is in a direction of "rotates reversely" and also the clutch outer 84, main shaft inner shaft 51A, and main shaft outer shaft 51B connected to the primary driven gear 87 are in the direction of "rotate reversely." However, the countershaft 53 connected by one-stage gear connection to the main shaft inner shaft 51A or the main shaft outer shaft 51B of the main shaft 51 is in a direction of "rotates forwardly," and "forward rotation" is outputted from the countershaft 53.

It is to be noted that the members following the gear 56 attached to the countershaft 53 are configured in accordance with the configuration of the gear power train 59.

In the present embodiment, the shift operation of the transmission 5 is controlled by an ECU (electronic controlling unit) provided on the motorcycle 1 not depicted. For example, upon traveling of the motorcycle 1, from between the first clutch apparatus 81A and the second clutch apparatus 81B, only one clutch apparatus which corresponds to the shift position at present is placed in a connection state while the other is placed in a disconnection state.

Consequently, power transmission is carried out through one of the main shaft inner shaft 51A and the main shaft outer shaft 51B and one of the first to seventh speed gear trains G1 to G7. When a shift change is to be carried out, the ECU uses the gear train corresponding to the next shift position thereby to create a state in which power transmission is permitted and controls operation of the first and second clutch apparatus 81A and 81B individually.

It is to be noted that, in the present embodiment, dog clutches 78 are provided on the main shaft side sprocket wheel 90 and the sixth speed driving gear 64 which serves as a shifter gear such that they mesh for engagement and disengagement with each other.

In particular, dog projections 78a are provided on a front side face of the sixth speed driving gear 64 directed to the main shaft side sprocket wheel 90 while dog recessed portions 78b are provided on a rear side face of the main shaft side sprocket wheel 90 directed to the sixth speed driving gear 64.

If the sixth speed driving gear 64 serving as a shifter gear is moved toward the main shaft side sprocket wheel 90 side by an operation of a first shift fork 94 to the first shifter 74 formed integrally thereon, then the dog projections 78a and the dog recessed portions 78b are engaged with each other so that the shifter gear (sixth speed driving gear) 64 can rotate integrally with the main shaft side sprocket wheel 90. In other words, the main shaft outer shaft (outer pipe) 51B on which the shifter gear (sixth speed driving gear) 64 is supported against relative rotation is placed into a state in which it can rotate integrally with the main shaft side sprocket wheel 90.

In the transmission 5 of the present embodiment, a transmission system for reversing is configured, and this is described below with reference to FIG. 5.

Figure 5:
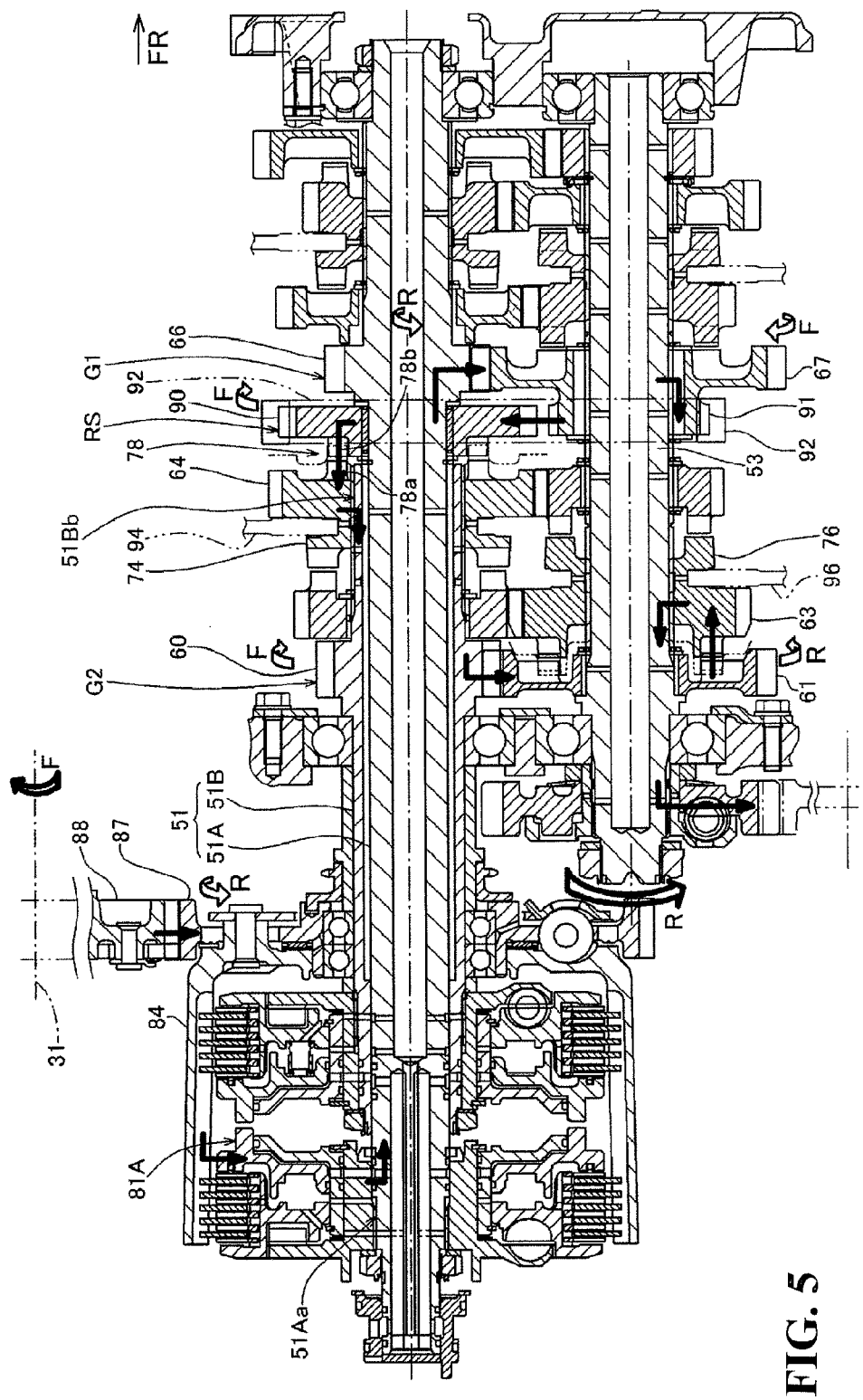
FIG. 5 is a reference view depicting part involved in a transmission system for reversing in FIG. 4 and a transmission route of rotational power upon reverse traveling by dark arrow marks.

In FIG. 5, elements which participate in the transmission system for reversing in FIG. 4 and transmission routes of rotational power upon reverse are indicated by dark arrow marks.

In a state in which engagement of the first to fourth shifters 74 to 77 described above is canceled except those described below, the first shifter 74 is moved forwardly as indicated by an alternate long and two short dashes line in FIG. 5 by the first shift fork 94, namely, the sixth speed driving gear 64 formed integrally and serving as a shift gear is moved forwardly, until it is engaged with the main shaft side sprocket wheel 90 by the dog clutches 78.

Meanwhile, the third shifter 76 is moved rearwardly as indicated by an alternate long and two short dashes line in FIG. 5 by the third shift fork 96, namely, the fourth speed driven gear 63 formed integrally, in the rearward direction until it is engaged with the second speed driven gear 61.

Then, the first clutch apparatus 81A is controlled to a "connection" state and the second clutch apparatus 81B is controlled to a "disconnection state."

If, in such a state as described above, the rotational direction of the crankshaft 31 is set to a "forward rotation" (in FIG. 5, arrow mark F) as described hereinabove, then by gear transmission between the primary driving gear 88 and the primary driven gear 87, the primary driven gear 87 makes a "reverse rotation R" and also the first clutch apparatus 81A and the main shaft inner shaft 51A make a "reverse rotation R."

Rotation of the main shaft inner shaft 51A as it is becomes rotation of the first speed driving gear 66 of the first speed gear train G1 and is further transmitted to the first speed driven gear 67, which serves as a floating gear, and by the gear transmission, the floating gear (first speed driven gear) 67 makes a "forward rotation F."

The rotation of the floating gear (first speed driven gear) 67 as it is becomes rotation of the countershaft side sprocket wheel 91 formed integrally and is a "forward rotation F."

Not only the first speed driven gear 67 but also the countershaft side sprocket wheel 91 are rotatable relative to the countershaft 53 and do not participate in the rotational direction of the countershaft 53.

A chain 92 for reverse traveling is wrapped around and extends between the countershaft side sprocket wheel 91 and the main shaft side sprocket wheel 90. Because of chain one-stage transmission, the main shaft side sprocket wheel 90 transmits a "forward rotation F" same as that of the countershaft side sprocket wheel 91.

The main shaft side sprocket wheel 90 is rotatable relative to the main shaft inner shaft 51A and does not participate in the rotational direction and reverse rotation of the main shaft inner shaft 51A.

It is to be noted that, in the present embodiment, the number of teeth of the countershaft side sprocket wheel 91 is 21 and the number of teeth of the main shaft side sprocket wheel 90 is 29, and the speed reduction gear ratio of the chain system in the reverse sprocket wheel train RS is $29/21 \approx 1.38$ and is higher than 1.

On the other hand, since the second clutch apparatus 81B is in a "disconnection" state, power from the internal combustion engine 4 is not inputted to the main shaft outer shaft 51B. Further, since the main shaft side sprocket wheel 90 is in engagement with the sixth speed driving gear 64 serving as a shifter gear by the dog clutches 78, the main shaft outer shaft 51B serving as an outer pipe on which the shifter gear (sixth speed driving gear) 64 is supported against relative rotation is integrally rotatable with the main shaft side sprocket wheel 90.

Therefore, the outer pipe (main shaft outer shaft 51B) makes a "forward rotation F," and the second speed driving gear 60 formed against relative rotation on the outer pipe (main shaft outer shaft 51B) and serving as a reverse transmission gear makes a "forward rotation F."

While the reverse transmission gear (second speed driving gear) 60 meshes with the second speed driven gear 61 supported for relative rotation on the countershaft 53, the second speed driven gear 61 to which rotation is transmitted by gear transmission makes "reverse rotation R."

Since the third shifter 76 is in engagement with the second speed driven gear 61 as described above, a "reverse rotation R" is transmitted to the fourth speed driven gear 63 integral with the third shifter 76, and to the countershaft 53 on which the fourth speed driven gear 63 is supported against relative rotation, a "reverse rotation R" is transmitted. Consequently, a "reverse rotation" (in FIG. 5, an arrow mark R) is outputted from the countershaft 53.

In particular, in the transmission 5 of the present embodiment, the transmission system for reversing is configured using driving force transmission of both of the gear system and the chain system.

It is to be noted that the elements following the gear 56 attached to the countershaft 53 are configured similarly to that of the gear power train 59.

In the transmission system for reversing as described above, rotational power is transmitted from the first speed driving gear 66 to the first speed driven gear 67 serving as a floating gear. However, since the transmission system for reversing is associated with the first speed gear train G1, the speed reduction gear ratio is higher than 1 and is comparatively high, and the speed reduction gear ratio for reversing can be assured by the gear system.

Further, although rotational power from the second speed driving gear 60 serving as a reverse transmission gear to the second speed driven gear 61, since they are associated with the second speed gear train G2, the speed reduction gear ratio is higher than 1 and is comparatively high, and the speed reduction gear ratio for reversing can be obtained readily by the gear system.

As a result, since the reduction gear ratio for reversing can be assured by the gear system, the reduction gear ratio required for the chain system can be suppressed, and it becomes unnecessary to make greater the size difference between the main shaft side sprocket wheel 90 and the countershaft side sprocket wheel 91. Further, it becomes possible to suppress the distance between the main shaft 51 and the countershaft 53 to a level similar to that of an ordinary transmission which uses only a gear transmission mechanism, and also deflection of the chain 92 can be suppressed. Therefore, the size of the transmission chamber 47 in which the chain 92 is used can be suppressed as seen from an outer periphery of the wrapped chain 92 indicated by an alternate long and two short dashes line in FIG. 3.

Characteristics of the transmission 5 of the present embodiment described above are described below together.

In particular, in a transmission 5 with a reverse includes a main shaft 51 in which a plurality of trains of driving gears 60, 62, 64, 66, 68, 70, and 72 are provided and to which rotation from an internal combustion engine 4 is inputted, a countershaft 53 on which a plurality of trains of driven gears 61, 63, 65, 67, 69, 71, and 73, which mesh with the plurality of trains of driving gears 60, 62, 64, 66, 68, 70, and 72, are provided and which is disposed in parallel to the main shaft 51, a main shaft side sprocket wheel 90 and a countershaft side sprocket wheel 91 provided for rotation on the main shaft 51 and the countershaft 53, respectively, and a chain 92 for reverse traveling wrapped around and extending between the main shaft side sprocket wheel 90 and the countershaft side sprocket wheel 91. One (first speed driven gear 67) of the plurality of driven gears is a floating gear provided for relative rotation on the countershaft 53. The countershaft side sprocket wheel 91 is provided for integral rotation with the floating gear (first speed driven gear) 67. The main shaft 51 includes a main shaft inner shaft 51A which includes the main shaft side sprocket wheel 90, and an outer pipe (main shaft outer shaft) 51B disposed coaxially on the outer side of the main shaft inner shaft 51A in a diametrical direction and capable of being placed into and out of integral rotation with the main shaft side sprocket wheel 90. A reverse transmission gear (second speed driving gear) 60, which meshes with a driven gear (second speed driven gear) 61 on the countershaft 53, is provided on the outer pipe 51B with a reduction gear ratio by the floating gear 67 (and) or the reverse transmission gear (second speed driving gear) 60 being set higher than 1.

Accordingly, rotation from the internal combustion engine 4 is transmitted from the driving gear (first speed driving gear) 66 of the main shaft inner shaft 51A to the floating gear (first speed driven gear) 67 which is a driven gear of the countershaft 53, from the floating gear 67 to the countershaft side sprocket wheel 91, from the countershaft side sprocket wheel 91 to the main shaft side sprocket wheel 90 through the chain 92, from the main shaft side sprocket wheel 90 to the outer pipe (main shaft outer shaft) 51B, from the outer pipe 51B to the reverse transmission gear (second speed driving gear) 60, and from the reverse transmission gear 60 to the driven gear (second speed driven gear) 61 of the countershaft 53. Consequently, since the transmission system for reversing the transmission 5 is configured using a driving force transmission of both of the gear system and the chain system, the necessity for an idling shaft for exclusive use for reversing is eliminated. Further, a reduction gear ratio higher than 1 can be assured in both of the gear systems of the floating gear 67 (and) or the reverse transmission gear 60.

Therefore, even if the reduction gear ratio for reversing the chain system between the main shaft side sprocket wheel 90 and the countershaft side sprocket wheel 91 is not raised very much, namely, even if the size difference between the two sprocket wheels 90 and 91 is not made very great, the reduction gear ratio for reversing can be assured in the gear system. As a result, the distance between the main shaft 51 and the countershaft 53 can be suppressed similarly as in an ordinary transmission which uses a gear transmission mechanism, and also deflection of the chain 92 is suppressed. Therefore, the size of the transmission chamber 47 in which the chain 92 is used can be suppressed.

Further, the transmission with a reverse can be configured such that a first clutch apparatus 81A and a second clutch apparatus 81B are provided in the transmission 5 between the transmission 5 and the internal combustion engine 4. The main shaft inner shaft 51A is connected at one end side 51Aa thereof to the first clutch apparatus 81A with the outer pipe 51B being a main shaft outer shaft 51B connected at one end side 51Ba thereof to the second clutch apparatus 81B. Part 60, 62, and 64 of the plurality of driving gears 60, 62, 64, 66, 68, 70, and 72 is provided on the main shaft outer shaft 51B. The sixth speed driving gear 64 as a shifter gear is provided on the main shaft outer shaft 51B for integral rotation with the main shaft outer shaft 51B and for movement in an axial direction. Dog clutches 78, which mesh for connection and disconnection with each other, are provided on the main shaft side sprocket wheel 90 and the shifter gear (sixth speed driving gear) 64.

Therefore, while the configuration of a so-called dual clutch type transmission in which two clutches are provided is used, a transmission system for reversing which uses both of a chain system and a gear system can be configured.

Further, the transmission with a reverse for a vehicle can be configured such that the main shaft outer shaft 51B is provided such that the other end portion 51Bb thereof extends to an intermediate portion of the main shaft inner shaft 51A to the other end portion 51Ab. The sixth speed driving gear 64 as a shifter gear is disposed on the other end portion 51Bb of the main shaft outer shaft 51B; and the main shaft side sprocket wheel 90 is disposed on the main shaft inner shaft 51A so as to neighbor with the other end portion 51Bb of the main shaft outer shaft 51B.

Therefore, meshing engagement between the shifter gear (sixth speed driving gear) 64 and the main shaft side sprocket wheel 90 can be established by a compact and simple configuration, and the main shaft side sprocket wheel 90 and the main shaft outer shaft 51B can be integrally rotated and can be separated from each other.

Further, a first speed driving gear 66 which drives the first speed driven gear 67 serving as a floating gear is provided adjacent the main shaft side sprocket wheel 90; and the floating gear (first speed driven gear) 67 and the countershaft side sprocket wheel 91 are formed integrally with each other.

Therefore, the floating gear (first speed driven gear) 67 and the countershaft side sprocket wheel 91 can be configured compactly.

Further, since a driving gear which drives the first speed driven gear 67 as a floating gear is the first speed driving gear 66, a reduction gear ratio for reversing the floating gear (first speed driven gear) 67 can be obtained readily by a comparatively high speed reduction gear ratio of the first speed gear train G1 formed from the first speed driven gear 67 and the first speed driving gear 66.

Further, the reverse transmission gear is a second speed driving gear 60 on the main shaft outer shaft 51B. Therefore, the reduction gear ratio for reversing the transmission gear (second speed driving gear) can be obtained readily by a comparatively high reduction gear ratio of the second speed gear train G2 formed from the second speed driving gear 60 with the second speed driven gear 61 serving as a driven gear on the countershaft 53 and meshing with the reverse transmission gear (second speed driving gear) 60.

Although the transmission with a reverse for a vehicle of an embodiment according to the present invention has been described, the mode of the present invention is not limited to the embodiment described above, and the present invention can be carried out in various modes without departing from the scope of the present invention.

For example, the transmission with a reverse for a vehicle is not limited to a dual clutch type transmission like that of the embodiment, and the main shaft including the main shaft inner shaft and the outer pipe may be connected to a single clutch apparatus.

Further, the power unit is not limited to that which is disposed such that the shafts such as the crankshafts are directed in the forward and rearward direction of the vehicle, but may be a power unit wherein the shafts are directed in the vehicle widthwise direction (leftward and rightward direction). Further, the internal combustion engine is not limited to that of the horizontally opposed type and also the type of the vehicle is not limited.

It is to be noted that, while the left-right arrangement of the individual apparatus is described specifying to that depicted in the figures for the convenience of description, the left-right reverse arrangement from that in the embodiment described above may be applied, and also this is included in the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transmission with a reverse for a vehicle comprising:
   a main shaft having a plurality of trains of driving gears that rotate with an input from an internal combustion engine;
   a countershaft having a plurality of trains of driven gears for meshing with the plurality of trains of driving gears, said countershaft being disposed in parallel to the main shaft;
   a main shaft side sprocket wheel and a countershaft side sprocket wheel provided for relative rotation on the main shaft and the countershaft, respectively; and
   a chain for reverse traveling wrapped around and extending between the main shaft side sprocket wheel and the countershaft side sprocket wheel;
   wherein one of the plurality of driven gears is a floating gear provided for relative rotation on the countershaft;
   the countershaft side sprocket wheel is provided for integral rotation with the floating gear;
   the main shaft includes a main shaft inner shaft which includes the main shaft side sprocket wheel, and an outer pipe disposed coaxially on an outer side of the main shaft inner shaft in a diametrical direction and capable of being placed into and out of integral rotation with the main shaft side sprocket wheel;
   a reverse transmission gear for meshing with a driven gear on the countershaft is provided on the outer pipe; and
   a reduction gear ratio by the floating gear and/or the reverse transmission gear is set higher than 1.

2. The transmission with a reverse for a vehicle according to claim 1, wherein:
   a first clutch and a second clutch are provided in the transmission with a reverse between the transmission and the internal combustion engine;
   the main shaft inner shaft is connected at one end side thereof to the first clutch;
   the outer pipe is a main shaft outer shaft connected at one end side thereof to the second clutch;
   part of the plurality of driving gears is provided on the main shaft outer shaft;
   a shifter gear is provided on the main shaft outer shaft for integral rotation with the main shaft outer shaft and for movement in an axial direction; and
   dog clutches for meshing connection and disconnection with each other are provided on the main shaft side sprocket wheel and the shifter gear.

3. The transmission with a reverse for a vehicle according to claim 2, wherein:
   the main shaft outer shaft is provided such that another end portion thereof extends to an intermediate portion of the main shaft inner shaft to another end portion;
   the shifter gear is disposed on the other end portion of the main shaft outer shaft; and
   the main shaft side sprocket wheel is disposed on the main shaft inner shaft so as to neighbor with the other end portion of the same main shaft outer shaft.

4. The transmission with a reverse for a vehicle according to claim 3, wherein:
   a driving gear for driving the floating gear is provided adjacent the main shaft side sprocket wheel; and
   the floating gear and the countershaft side sprocket wheel are formed integrally with each other.

5. The transmission with a reverse for a vehicle according to claim 2, wherein a driving gear for driving the floating gear is a first speed driving gear.

6. The transmission with a reverse for a vehicle according to claim 3, wherein a driving gear for driving the floating gear is a first speed driving gear.

7. The transmission with a reverse for a vehicle according to claim 4, wherein a driving gear for driving the floating gear is a first speed driving gear.

8. The transmission with a reverse for a vehicle according to claim 2, wherein the reverse transmission gear is a second speed driving gear on the main shaft outer shaft.

9. The transmission with a reverse for a vehicle according to claim 3, wherein the reverse transmission gear is a second speed driving gear on the main shaft outer shaft.

10. The transmission with a reverse for a vehicle according to claim 4, wherein the reverse transmission gear is a second speed driving gear on the main shaft outer shaft.

11. A transmission with a reverse for a vehicle comprising:
    a main shaft having a plurality of trains of driving gears;
    a countershaft having a plurality of trains of driven gears which mesh with the plurality of trains of driving gears, said countershaft being disposed in parallel to the main shaft;
    a main shaft side sprocket wheel and a countershaft side sprocket wheel provided for relative rotation on the main shaft and the countershaft, respectively; and
    a chain for reverse operation of the transmission, said chain being wrapped around and extending between the main shaft side sprocket wheel and the countershaft side sprocket wheel;
    wherein one of the plurality of driven gears is a floating gear provided for relative rotation on the countershaft with the countershaft side sprocket wheel being provided for integral rotation with the floating gear;
    the main shaft includes a main shaft inner shaft which includes the main shaft side sprocket wheel, and an outer pipe disposed coaxially on an outer side of the main shaft inner shaft in a diametrical direction and capable of being placed into and out of integral rotation with the main shaft side sprocket wheel;

a reverse transmission gear mounted on the outer pipe, said reverse transmission gear meshing with a driven gear on the countershaft; and a reduction gear ratio by the floating gear and/or the reverse transmission gear is set higher than 1.

12. The transmission with a reverse for a vehicle according to claim 11, wherein:

a first clutch and a second clutch are provided in the transmission with a reverse between the transmission and an internal combustion engine;

the main shaft inner shaft is connected at one end side thereof to the first clutch;

the outer pipe is a main shaft outer shaft connected at one end side thereof to the second clutch;

part of the plurality of driving gears is provided on the main shaft outer shaft;

a shifter gear is provided on the main shaft outer shaft for integral rotation with the main shaft outer shaft and for movement in an axial direction; and dog clutches for meshing connection and disconnection with each other are provided on the main shaft side sprocket wheel and the shifter gear.

13. The transmission with a reverse for a vehicle according to claim 12, wherein:

the main shaft outer shaft is provided such that another end portion thereof extends to an intermediate portion of the main shaft inner shaft to another end portion;

the shifter gear is disposed on the other end portion of the main shaft outer shaft; and the main shaft side sprocket wheel is disposed on the main shaft inner shaft so as to neighbor with the other end portion of the same main shaft outer shaft.

14. The transmission with a reverse for a vehicle according to claim 13, wherein:

a driving gear for driving the floating gear is provided adjacent the main shaft side sprocket wheel; and the floating gear and the countershaft side sprocket wheel are formed integrally with each other.

15. The transmission with a reverse for a vehicle according to claim 12, wherein a driving gear for driving the floating gear is a first speed driving gear.

16. The transmission with a reverse for a vehicle according to claim 13, wherein a driving gear for driving the floating gear is a first speed driving gear.

17. The transmission with a reverse for a vehicle according to claim 14, wherein a driving gear for driving the floating gear is a first speed driving gear.

18. The transmission with a reverse for a vehicle according to claim 12, wherein the reverse transmission gear is a second speed driving gear on the main shaft outer shaft.

19. The transmission with a reverse for a vehicle according to claim 13, wherein the reverse transmission gear is a second speed driving gear on the main shaft outer shaft.

20. The transmission with a reverse for a vehicle according to claim 14, wherein the reverse transmission gear is a second speed driving gear on the main shaft outer shaft.

* * * * *